US010582468B2

(12) United States Patent
Britt et al.

(10) Patent No.: US 10,582,468 B2
(45) Date of Patent: Mar. 3, 2020

(54) REGISTRATION OF DEVICES FOR USE OF ONE OR MORE SERVICES

(71) Applicant: Time Warner Cable Enterprises LLC, New York, NY (US)

(72) Inventors: Douglass J. Britt, Great Falls, VA (US); Carl K. Tebell, Manassas, VA (US); Robert A. Cerbone, Potomac, MD (US); Peter Stern, Greenwich, CT (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 241 days.

(21) Appl. No.: 14/625,992

(22) Filed: Feb. 19, 2015

(65) Prior Publication Data

US 2016/0249314 A1   Aug. 25, 2016

(51) Int. Cl.
| | |
|---|---|
| *H04W 60/04* | (2009.01) |
| *H04W 8/18* | (2009.01) |
| *H04W 68/00* | (2009.01) |
| *H04W 12/06* | (2009.01) |
| *H04W 12/08* | (2009.01) |
| *H04W 84/12* | (2009.01) |
| *H04W 88/08* | (2009.01) |

(52) U.S. Cl.
CPC ............ *H04W 60/04* (2013.01); *H04W 8/18* (2013.01); *H04W 12/06* (2013.01); *H04W 12/08* (2013.01); *H04W 68/00* (2013.01); *H04W 84/12* (2013.01); *H04W 88/08* (2013.01)

(58) Field of Classification Search
CPC ...... H04W 84/12; H04W 88/08; H04W 12/08

USPC ........................................... 455/414.1–414.3
See application file for complete search history.

(56) References Cited

U.S. PATENT DOCUMENTS

| | | | | |
|---|---|---|---|---|
| 9,143,400 | B1* | 9/2015 | Roskind | H04L 41/08 |
| 2010/0138900 | A1* | 6/2010 | Peterka | H04L 12/2812 726/4 |
| 2013/0309971 | A1* | 11/2013 | Kiukkonen | H04L 63/107 455/41.2 |
| 2015/0139210 | A1* | 5/2015 | Marin | H04W 12/04 370/338 |
| 2015/0215832 | A1* | 7/2015 | Fitzpatrick | H04W 48/18 455/426.1 |
| 2015/0223068 | A1* | 8/2015 | Thelen | H04L 63/083 726/7 |
| 2017/0019409 | A1* | 1/2017 | Shalunov | H04L 12/6418 |

\* cited by examiner

*Primary Examiner* — Jaime M Holliday
(74) *Attorney, Agent, or Firm* — Armis IP Law, LLC

(57) ABSTRACT

A device profile manager receives notification of a user operating a mobile communication device in a subscriber domain. In response to detecting authorized usage of the mobile communication device in the subscriber domain, the device profile manager initiates registering of the mobile communication device and/or corresponding non-head of household user for subsequent use of incremental subscription services assigned to the subscriber domain. Subsequent to auto-registration of the mobile communication device to use services associated with the subscriber domain, the non-head of household user operating the mobile communication device is able to use the incremental subscription services assigned to the subscriber domain based on the identifier value of the mobile communication device without submission of access credentials.

53 Claims, 10 Drawing Sheets

REGISTRATION OF DEVICES FOR USE OF ONE OR MORE SERVICES

BACKGROUND

It is well known that cable network service providers typically provide corresponding subscribers use of a number of cable network services. For example, an in-home cable network subscription may include, in addition to standard cable TV services, a so-called data plan (or Internet plan) in which the respective occupants in a subscriber domain are able to access the Internet.

Typically, when a subscriber service includes a respective data plan, the cable network service provider provides the subscriber a WiFi™ base station for use in the subscriber domain. For each instance of use, if a respective user provides appropriate credentials such as username and/or passkey, the WiFi™ base station in the subscriber domain enables the respective user to communicate with the Internet over a respective wireless communication link and corresponding cable modem.

Users that subscribe to an in-home data service plan (during which users use one or more data channels of a shared communication link to access the Internet) are often afforded the ability, at no extra cost, to use any of multiple WiFi™ hotspots provided by the corresponding cable network service provider. In other words, in certain instances, because a subscriber subscribes to use of a data plan as discussed above, a respective cable network service provider may provide the subscriber an incremental service such as access to the Internet via any of thousands of WiFi™ access points available at different public WiFi™ hotspot locations outside of a respective home.

Use of one or more wireless access points may be only one type of incremental service provided by a respective cable network service provider. In many instances, a respective cable network service provider provides many different types of incremental services, each of which may require appropriate authentication/authorization and registration before use.

BRIEF DESCRIPTION OF EMBODIMENTS

Conventional techniques of providing subscriber services suffer from deficiencies. For example, conventional registration of mobile communication devices to use corresponding services is often tedious because each of one or more devices and/or corresponding users must be manually registered before use. For each service, registration can include providing appropriate credentials indicating that the device and corresponding user are authorized for use.

It is typically difficult for a subscriber user to remember credentials such as an appropriate password required for using even a single service such as for WiFi™ access; keeping track of multiple sets of different credentials (such as one set of credentials for each of multiple different subscriber services) is a yet more difficult task for a respective subscriber.

Thus, even though a respective subscriber may pay for use of a number of different services from a cable network service provider, the subscriber may not be able to use certain elements of the services because they have misplaced one or more credentials that are required to use respective services associated with their subscription.

In contrast to conventional techniques, embodiments herein include simplifying registration of devices for use of one or more services.

More specifically, in accordance with one embodiment, a device profile manager in a network environment detects authorized use of a mobile communication device to access a remote network through a communication resource in a subscriber domain. In one embodiment, detecting authorized use of the mobile communication device in the subscriber domain includes detecting proper authentication of the mobile communication device during use of a wireless access point in the subscriber domain.

In response to detecting the authorized use of the mobile communication device in the subscriber domain, the device profile manager automatically registers the mobile communication device for use of supplemental subscription services associated with the subscriber domain. For example, in one embodiment, registering the mobile communication device includes: receiving a unique identifier value (such as a unique MAC address) assigned to the mobile communication device; and communicating the unique identifier value of the mobile communication device to one or more authentication resources controlling use of the supplemental subscription services associated with the subscriber domain.

Subsequent to registration, the authentication resources (and respective systems) associated with the different services provide a user operating the mobile communication device use of the subscription services associated with the subscriber domain. For example, in one embodiment, each of the authentication resources (associated with the different services) stores a copy of the unique identifier value (such as a MAC number) assigned to the mobile communication device as forwarded by the device profile manager during auto-registration as discussed above. In one embodiment, the authentication resources provide use of the services to the auto-registered mobile communication device based upon the unique identifier value assigned to the mobile communication device. That is, when the mobile communication device provides its unique identifier value to an authentication resource (of a requested service) subsequent to the auto-registration, the corresponding authentication resource provides use of respective service because the unique identifier value corresponds to a device that has been previously registered to use the service.

Accordingly, upon detecting that a mobile communication device is authorized for use in a subscriber domain, a mobile communication device can be automatically registered for use of other (incremental) services associated with the subscriber domain. This alleviates the head of household user in the subscriber domain from having to manually register each device for use of incremental services assigned to the subscriber domain.

In accordance with further embodiments, subsequent to registering a respective mobile communication device with a subscriber domain and corresponding subscription services, the user of the mobile communication device may operate the mobile communication device at a remote location with respect to the subscriber domain to which the mobile communication device is associated. In one embodiment, as discussed above, a mobile communication device can be registered as being associated with a particular subscriber domain and/or subscriber account.

Assume that subsequent to registering a mobile communication device with a subscriber domain, the mobile communication device attempts to use a service (such as use of a publicly located WiFi™ hotspot provided by the service provider) outside of the subscriber domain. More specifically, assume that the mobile communication device attempts to use a wireless access point located outside of the subscriber domain to access the Internet. Prior to allowing use of a respective wireless access point, the wireless access point forwards a unique identifier value (such as a MAC address) of the mobile communication device to an appropriate authentication resource associated with the requested WiFi™ access point service. The authentication resource associated with the requested service verifies that the mobile communication device has been previously registered to use the requested wireless service. This can include verifying that the identifier value assigned to the mobile communication device is stored in a list of unique identifier values (unique MAC addresses) assigned to devices that are allowed to use the requested service.

The requested service can include an advertisement engine to initiate display of messages on a display screen of the mobile communication device during use of the requested service. In one embodiment, the advertisement engine is configured to display advertisements on the display screen of the mobile communication device depending upon the current location of the mobile communication device.

The current location of the mobile communication device and corresponding wireless access point can be determined in any number of ways. In one embodiment, the wireless access point and/or mobile communication device can be configured to transmit location information (indicating a current location of the mobile communication device and/or wireless access point) to the advertisement engine. Thus, the advertisement engine may have knowledge of the current location of the mobile communication device. If desired, during use of a wireless communication link between the mobile communication device and the wireless access point, the advertisement engine can be configured to transmit, to the mobile communication device, advertisement messages pertaining to the current location of the mobile communication device.

As an alternative to rendering advertisements pertinent to the current location of the mobile communication device, the advertisement engine can be configured to transmit, to the mobile communication device, advertising messages pertaining to a location of the subscriber domain to which the mobile communication device has been associated. For example, the advertising engine can be configured to map an identity (such as the unique MAC address) of the mobile communication device to a location of the subscriber domain to which the mobile communication device was associated during auto-registration as previously discussed. In such an instance, rather than transmitting advertising information pertinent to the location where the mobile communication device happens to currently reside, the advertising engine transmits advertising messages derived from or associated with the location of the subscriber domain for display on the display screen of the mobile communication device for viewing by the respective user.

Accordingly, in this latter embodiment, even though a respective user of a mobile communication device resides at a remote location such as a location far away from a registered subscriber domain, the respective user of the mobile communication device can receive advertising information pertinent to the location of the subscriber domain where the user frequents or domiciles. Thus, when a respective user travels to another state, rather than receiving advertisements that are not particularly relevant to the user from the other state or foreign locale, the user or registered mobile communication device receives advertisements based on the location of the subscriber domain (such as where a user of the mobile communication device domiciles) to which the mobile communication device is associated.

These and other more specific embodiments are disclosed in more detail below.

Note that any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any physical computer readable hardware storage medium) on which software instructions are encoded for subsequent execution. The instructions, when executed in a computerized device (e.g., computer processing hardware) having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the operations explained herein.

Accordingly, embodiments herein are directed to a method, system, computer program product, etc., that supports operations as discussed herein.

One or more further embodiments herein include a computer readable storage medium and/or system having instructions stored thereon. The instructions, when executed by computer processor hardware, cause the computer processor hardware (such as at one or more locations) to: in response to detecting authorized use of a mobile communication device to access a remote network through a communication resource in a subscriber domain, register the mobile communication device for subsequent use of subscription services associated with the subscriber domain; and subsequent to the registration, based on a unique identifier value of the mobile communication device, provide a user operating the mobile communication device subsequent use of the subscription services associated with the subscriber domain.

One or more further embodiments herein include a computer readable storage medium and/or system having instructions stored thereon. The instructions, when executed by computer processor hardware, cause the computer processor hardware (such as at one or more locations) to: enable occupants in a subscriber domain access to a remote network through a wireless access point, the wireless access point in communication with the remote network over a shared communication link; detect use of the wireless access point by a mobile communication device in the subscriber domain, the mobile communication device operated by a respective occupant in the subscriber domain; and in response to detecting the use of the wireless access point by the mobile communication device, register the mobile communication device for subsequent use of a service assigned to the subscriber domain.

One or more further embodiments herein include a computer readable storage medium and/or system having instructions stored thereon. The instructions, when executed by computer processor hardware, cause the computer processor hardware (such as at one or more locations) to: map an identity of a mobile communication device operated by a respective user to a corresponding location of a subscriber domain to which the mobile communication device is associated; retrieve advertising information pertinent to the corresponding location of the subscriber domain; and while the mobile communication device is operated by the respective user at a location outside of the subscriber domain, transmit the advertising information to the mobile communication device for display to the user.

The ordering of the operations above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for providing simplified registration for use of one or more services. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

Figure 1:
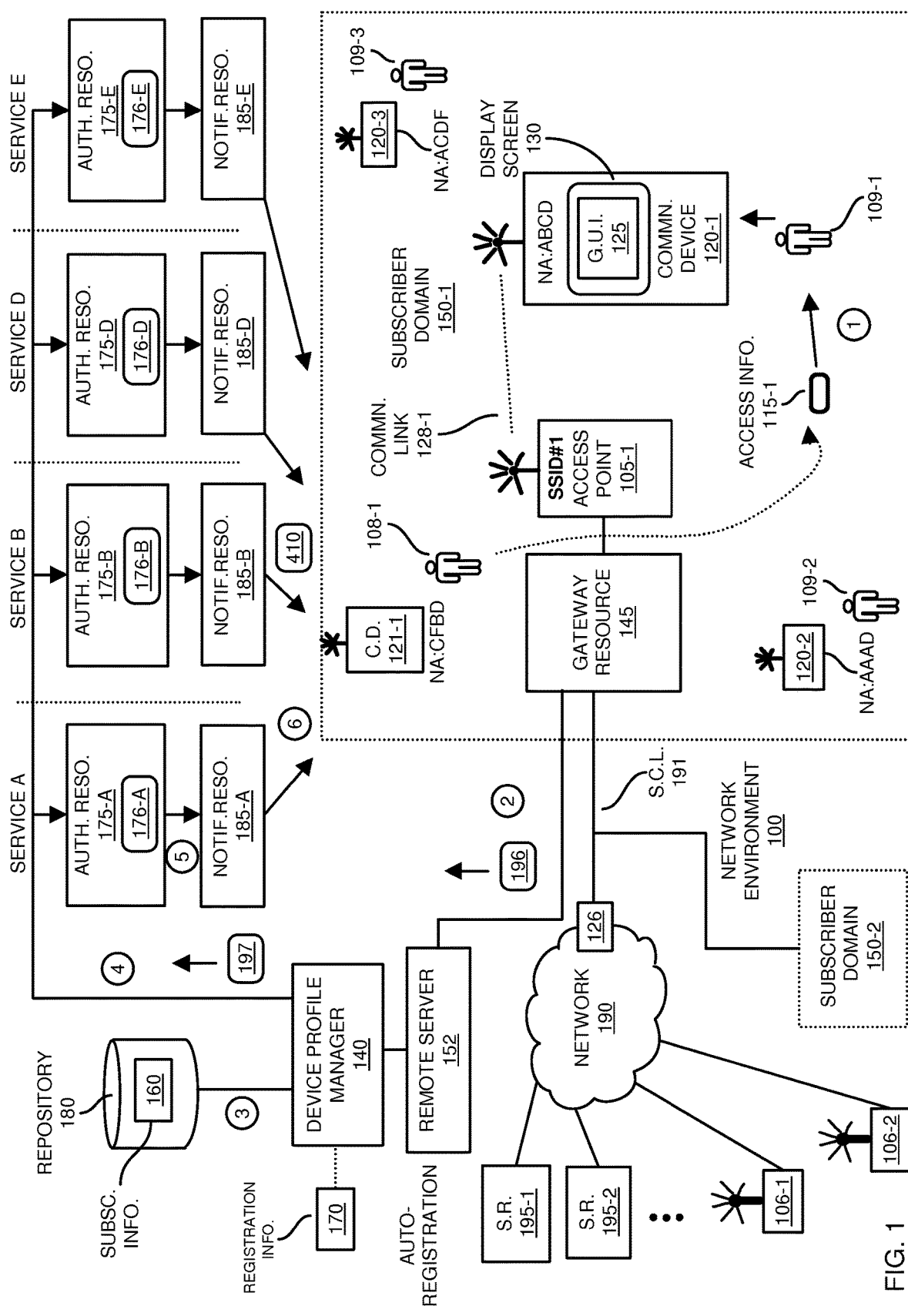
FIG. 1 is an example diagram illustrating use of a device profile manager to register devices in a subscriber domain according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

Now, more specifically, FIG. 1 is an example diagram illustrating access management and automatic registration of services according to embodiments herein.

Note that each of the functional blocks in network environment 100 (such as any of mobile communication devices, wireless access points, gateway resource, management resources, device profile manager, remote server, etc.) represents any suitable hardware, firmware, and/or software to carry out functionality as discussed herein.

As shown in this example, network environment 100 such as a cable network environment includes one or more subscriber domains 150 including subscriber domain 150-1, subscriber domain 150-2, etc. The collection of the subscriber domains 150 can represent a service group in the cable network.

In one embodiment, in addition to providing network access through a wireless access point in the subscriber domain, a respective cable network service provider provides one or more occupants in each of the multiple subscriber domains 150 (such as home environments, business environments, etc.) use of one or more additional subscription services (such as incremental services A, B, D, E, etc.). Use of any of the incremental services A, B, D, E, etc., may require that a respective user 108-1 operating mobile communication device 121-1 (at least initially) provide an appropriate signed identifier and password to register and use such services. Thereafter, occupants authorized to use a service associated with the subscriber domain 150-1 such as use of the wireless access point 105-1 can be automatically registered to use the supplemental services A, B, D, E, etc., as further discussed below.

In one non-limiting example embodiment, assume that subscription service A represents a (WiFi™ anywhere) service enabling the respective user to use the service providers available WiFi™ hotspots in public locations; assume that subscription service B (such as TV anywhere) represents a service enabling a respective subscriber to receive television content from any location in a network; assume that subscription service D represents a (WiFi™ Finder) service enabling the respective user to find locations of available WiFi™ hotspots in public locations; and so on.

In accordance with further embodiments, shared communication link 191 can be configured to include one or more physical cables such as coaxial cables, fiber-optic cables, etc. The shared communication link 191 can be partitioned to include one or more sets of allocated channels (such as on-demand television channels, one or more linear television channels, one or more digital data channels supporting data packet transmission, etc.) facilitating conveyance of content to and from the respective subscriber domains 150.

Note that each subscriber domain in network environment 100 can include a respective gateway resource (including for supporting cable modem services) and wireless access point providing access to shared communication link 191 in a similar manner that wireless access point 105-1 and corresponding gateway resource 145 provide access to network 190.

In this example embodiment, as mentioned, assume that the user 108-1 is the head of household subscriber associated with subscriber domain 150-1. The head of household subscriber may be required to pay respective fees and sign a contract with a respective cable network service provider for one or more services associated with a subscription plan. The subscription plan can include use of shared communication link 191 (such as a data plan) to access the network 190 such as the Internet. User 108-1 operates communication device 121-1 assigned unique identifier value CFBD (such as a unique MAC address).

An entity such as a cable network service provider (providing services as discussed herein) produces subscriber information 160 to keep track of information associated with each of the subscriber domains 150. As more particularly illustrated in FIG. 2, the subscriber information 160 or portions thereof can be saved at any of one or more different locations in the network environment 100.

Referring again to FIG. 1, assume that the head of household user 108-1 authorizes the user 109-1 operating mobile communication device 120-1 use of a subscriber domain 150-1 service such as use of wireless access point 105-1 to access network 190 the Internet. In one embodiment, to use wireless access point 105-1, the user 108-1 provides access information 115-1 (such as access credentials) to user 109-1.

The access information 115-1 can be any suitable information such as an encryption key (such as a multi-character string of data), passkey, logon credentials, password, unique identifier value, etc. The user 109-1 may be any suitable party such as a person that domiciles in subscriber domain 150-1, a friend of user 108-1 that does not domicile in subscriber domain 150-1, etc.

In addition to providing the access information 115-1 to user 109-1, note that the head of household user 108-1 may provide access information 115-1 (for use of wireless access point 105-1) to any number of users including user 109-2, user 109-3, . . . , such that the other users 109 are also able to utilize the wireless access point 105-1 to communicate through gateway resource 145 and shared communication link 191 to network 190.

Note that each of the wireless access points and respective mobile communication devices in network environment 100 can communicate with each other via any suitable wireless protocol. In one non-limiting example embodiment, each of the wireless access points 105 and 106 and corresponding mobile communication devices support wireless communications and establishment of wireless communication links in accordance with WiFi™ standards such as IEEE (Institute of Electrical and Electronics Engineers) 802.11a, 802.11b, 802.11g, 802.11n, 802.11ac, etc.

For further sake of illustration, assume in this example that the occupant user 109-1 in subscriber domain 150-1 wishes to use network access services provided by wireless access point 105-1 and gateway resource 145 assigned to subscriber domain 150-1.

Prior to providing the mobile communication device 120-1 access to shared communication link 191 and network 190, one or more communication resources such as the gateway resource 145, wireless access point 105-1, remote server 152, etc., individually or in combination, verify whether the mobile communication device 120-1 and corresponding user 109-1 should be afforded network access. Note that wireless access point 105-1 can be integrated in the gateway resource 145.

In this example embodiment, assume that the access information 115-1 provided by the user 108-1 includes the appropriate credentials (such as a string of text symbols) to use the wireless access point 105-1 corresponding network services. Because the user 109-1 has been provided access information 115-1 and the SSID1 (network name) needed to use wireless access point 105-1, the user 109-1 is able to establish a respective wireless communication link 128-1 between the mobile communication device 120-1 and the wireless access point 105-1.

For example, the mobile communication device 120-1 uses the SSID to indicate a desire to establish a wireless communication link 128-1 with the wireless access point 105-1.

Establishment of the wireless communication link 128-1 between the mobile communication device 120-1 in the wireless access point 105-1 can further include authentication of the mobile communication device 120-1 and proper use of access information 115-1 by the communication device 120-1. If desired, authentication can include communications with any of one or more different communication resources in the network environment 100 to verify that the mobile communication device 120-1 is authorized to use the wireless access point 105-1.

Subsequent to confirming that the mobile communication device 120-1 is authorized to use the wireless access point 105-1 based on use of the appropriate access information 115-1 provided by the user 108-1, the combination of the wireless access point 105-1, gateway resource 145, and shared communication link 191 enable the user 109-1 in subscriber domain 150-1 to access network 190 such as the Internet. That is, through gateway resource 145, the wireless access point 105-1 is communicatively coupled to the shared communication link 191 and network 190.

In accordance with further embodiments, in response to detecting that the user 109-1 and corresponding device 120-1 are authorized to access the network 190 from subscriber domain 150-1, any of one or more resources (such as gateway resource 145, wireless access point 105-1, etc.) in the subscriber domain 150-1 initiates forwarding of a communication 196 to remote server 152.

The communication 196 can indicate that communication device 120-1 has been authorized (based on access information 115-1) to use the wireless access point 105-1. The communication 196 can include the unique identifier value ABCD assigned to the mobile communication device 120-1 as well as additional identifier information indicating that the communication 196 is associated with authorized use of the mobile communication device 120-1 in subscriber domain 150-1. The additional identifier information can be any suitable information such as: a unique identifier value (such as a MAC address) assigned to the wireless access point 105-1, a unique identifier value (such as a network address) assigned to the gateway resource 145, etc.

Remote server 152 forwards the communication 196 and/or information therein to device profile manager 140. The device profile manager 140 initiates registering of the mobile communication device 120-1 and/or user 109-1 (such as a non-head of household user) for use of services associated with the subscriber domain 150-1.

Figure 2:
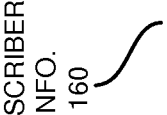
FIG. 2 is a diagram illustrating example generation and use of subscriber information according to embodiments herein.

For example, initially, the device profile manager 140 maps the additional identifier information (such as a unique network address of gateway resource 145) in the received communication 196 to an entry (namely subscriber domain 150-1) in subscriber information 160 in FIG. 2 to determine that the communication 196 pertains to subscriber domain 150-1. According to the subscriber information 160, the device profile manager 140 learns that the subscription services A, B, D, and E have been assigned to subscriber domain 150-1.

Figure 3:
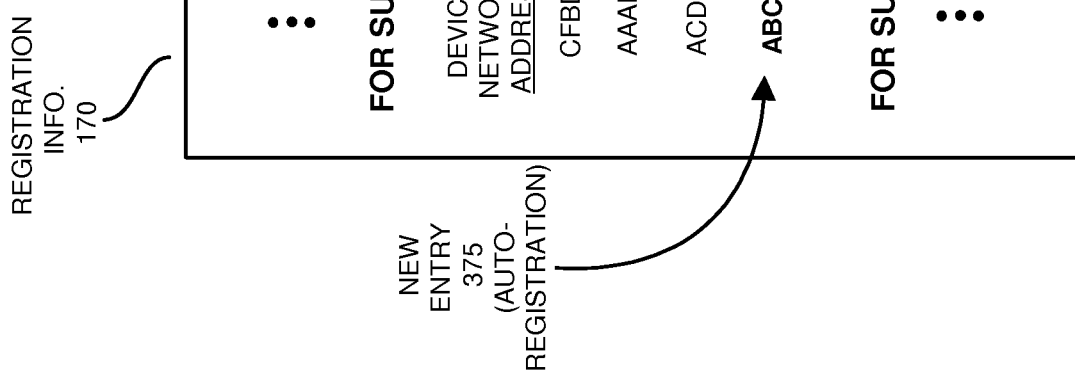
FIG. 3 is a diagram illustrating example generation and use of registration information according to embodiments herein.

In one embodiment, prior to attempting registration, the device profile manager 140 accesses registration information 170 more particularly shown in FIG. 3 to determine whether or not the mobile communication device 120-1 (and corresponding identifier ABCD) has been registered to use any services associated with subscriber domain 150-1. In general, the registration information 170 indicates the identifier values of the devices that have been associated with subscriber domain 150-1. In this example embodiment, assume that the mobile communication device 120-1 has not yet been registered to use incremental services A, B, D, and E associated with subscriber domain 150-1. In such an instance, because the mobile communication device 120-1 has not yet been registered for use of the incremental services associated with subscriber domain 150-1, the device profile manager 140 initiates registration of the mobile communication device 120-1 to use such services.

To provide the mobile communication device 120-1 corresponding user 109-1 use of the incremental services associated with subscriber domain 150-1, the device profile manager 140 generates and transmits the communication 197 including identifier value ABCD of the mobile communication device 120-1 to each of the authentication resources 175 associated with the different services A, B, D, and E (services associated with subscriber domain 150-1) to enable the mobile communication device 120-1 and corresponding user 109-1 to use the services A, B, D, and E in the future.

As further shown in FIG. 1, network environment 100 includes authentication resource 175-A, which provides authentication for use of service A by one or more users; network environment 100 includes authentication resource 175-B, which provides authentication for use of service B; network environment 100 includes authentication resource 175-D, which provides authentication for use of service D; and network environment includes authentication resource 175-E, which provides authentication for use of service E.

Upon receiving communication 197 from the device profile manager 140, each of the authentication resources 175 stores the identifier value ABCD of the mobile communication device 120-1 in a respective registered user/device list to indicate that the mobile communication device 120-1 and user are authorized to use a respective service in the future.

For example, based on receipt of communication 197, the authentication resource 175-A stores the unique identifier value ABCD associated with the mobile communication device 120-1 in list 176-A (e.g., a list of unique identifier values of devices that are authorized to use subscription service A); based on receipt of communication 197, the authentication resource 175-B stores the unique identifier value ABCD associated with the mobile communication device 120-1 in list 176-B (e.g., a list of unique identifier values of devices that are authorized to use subscription service B); based on receipt of communication 197, the authentication resource 175-D stores the unique identifier value ABCD associated with the mobile communication device 120-1 in list 176-D (e.g., a list of unique identifier values of devices that are authorized to use subscription service D); based on receipt of communication 197, the authentication resource 175-E stores the unique identifier value ABCD associated with the mobile communication device 120-1 in list 176-E (e.g., a list of unique identifier values of devices that are authorized to use subscription service E).

Via the inclusion of the identifier value in each of the lists 176, the mobile communication device 120-1 inherits the ability to use each of one or more services assigned to a respective subscriber domain 150-1 or corresponding subscriber 108-1 merely based upon detection of authorized use of the mobile communication device 120-1 in the subscriber domain 150-1. In one embodiment, each of the devices that inherits the ability to use the incremental services assigned to the subscriber domain is limited to the restrictions of use assigned for that service to the subscriber domain.

Subsequent to the device profile manager 140 initiating registration of the mobile communication device 120-1 for use of the different services associated with subscriber domain 150-1, the device profile manager 140 updates the registration information 170 to indicate completion of the auto-registration process for mobile communication device 120-1. This can include adding new entry 375 to the registration information 170. Thus, on a subsequent authorized use of the mobile communication device 120-1 in the subscriber domain 150-1, via a lookup to the registration information 170, the device profile manager 140 will know that the mobile communication device 120-1 has already been registered for use of the incremental services associated with the subscriber domain 150-1. This will alleviate the need for the device profile manager 140 from attempting to auto-register the mobile communication device 120-1 again.

Subsequent to registering a respective mobile communication device 120-1 for use of one or more respective services, the services provide notification (via a single consolidated notification or multiple individual notifications) to the user 108-1 that the respective mobile communication device 120-1 has been registered for use of incremental services associated with the subscriber domain 150-1.

More specifically, in one embodiment, upon registering the identifier value ABCD associated with the mobile communication device 120-1 to list 176-A, the notification resource 185-A associated with service A provides a notification 410 to user 108-1 indicating that the mobile communication device 120-1 has been registered for use of service A.

Upon registering the identifier value ABCD associated with the mobile communication device 120-1 in list 176-B, the notification resource 185-B associated with service B provides notification 410 to user 108-1 indicating that the mobile communication device 120-1 has been registered for use of service B.

Upon registering the identifier value ABCD associated with the mobile communication device 120-1 in list 176-D, the notification resource 185-D associated with service D provides notification 410 to user 108-1 indicating that the mobile communication device 120-1 has been registered for use of service D.

Upon registering the identifier value ABCD associated with the mobile communication device 120-1 in list 176-E, the notification resource 185-E associated with service E provides notification 410 to user 108-1 indicating that the mobile communication device 120-1 has been registered for use of service E.

As mentioned above, instead of sending individual messages, network environment 100 can include appropriate resource to generate a single (unified) message notifying the user 108-1 that the mobile communication device 120-1 operated by respective user 109-1 is now able to use any of the services A, B, D, and E associated with the subscriber domain 150-1.

Note that the notification 410 can be transmitted to the user 108-1 in any suitable manner. For example, the notification 410 can be an email, an in-browser overlay message (such as placing of an image message over an existing image in a browser), an audible communication, a cell phone text message, etc.

Figure 4:
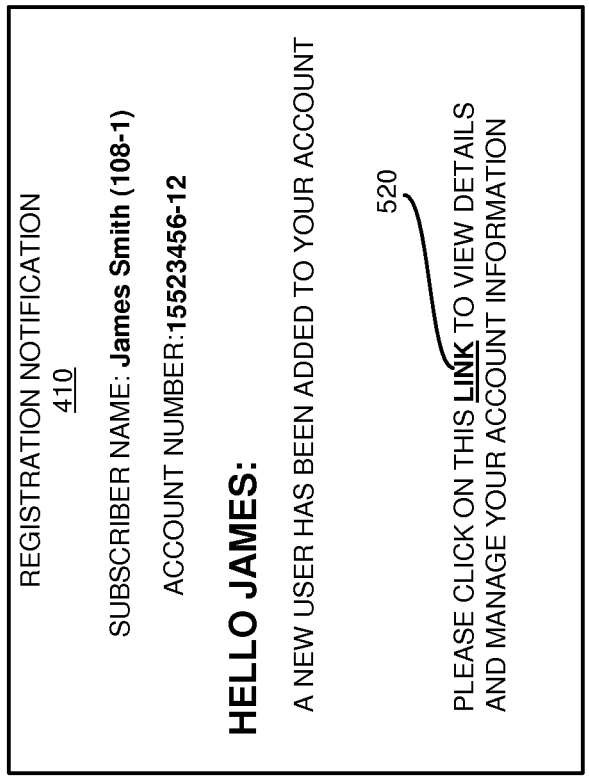
FIG. 4 is an example diagram illustrating a registration notification according to embodiments herein.

FIG. 4 is an example diagram of a registration notification according to embodiments herein.

As shown in this example embodiment, the notification 410 can indicate that the new user 109-1 and corresponding mobile communication device 120-1 have been added as a user associated with account 15523456-12 assigned to subscriber domain 150-1. To make changes to access rights associated with services A, B, D, and E for mobile communication device 120-1, the user 108-1 can click on link 520 to view and modify settings associated with the different devices that are registered to use corresponding subscription services associated with subscriber domain 150-1.

For example, in response to selecting link 520 in the notification 410, the mobile communication device 121-1 initiates display of a management graphical user interface to modify settings of mobile communication devices that have been registered to use services associated with subscriber domain 150-1. If desired, the user 108-1 can change the auto registration settings such that the user 109-1 corresponding mobile communication device 120-1 are no longer able to use any of one or more services A, B, D, or E.

As a more specific example, in response to receiving a command initiated from the user 108-1 to disable the mobile communication device 120-1 from using service A, the authentication resource 175-A removes the identifier value ABCD from the list 176-A. In response to receiving a command initiated from the user 108-1 to disable the mobile communication device 120-1 from using service B, the authentication resource 175-B removes the identifier value ABCD from the list 176-B. In a similar manner, the user 108-1 can disable the mobile communication device 120-1 from using any of the services.

In accordance with further embodiments, each of the respective services can keep track of corresponding use by the mobile communication device 120-1 and user 109-1. The user 108-1 operates a respective graphical user interface to view historical use of the services by each of the registered devices.

Note that further embodiments herein can include providing the head of household 108-1 of the subscriber domain 150-1 access to usage information. For example, if desired, the one or more resources in network environment 100 can be configured to keep track of use of services by the different devices registered to use services associated with subscriber domain 150-1 and produce usage information indicating usage of respective services (such as subscription services A, B, D, E) by the mobile communication devices.

Further, the head of household user 108-1 can generate a request (communication) to view the usage information. For example, the user 108-1 is able to view the usage information on a respective display screen. The usage information can indicate information such as times that a respective mobile communication device uses each service, duration of using a respective service, name of user using the respective service, etc., associated with use of subscription services A, B, D, E, by each of the devices registered to use services associated with the subscriber domain 150-1.

Figure 5:
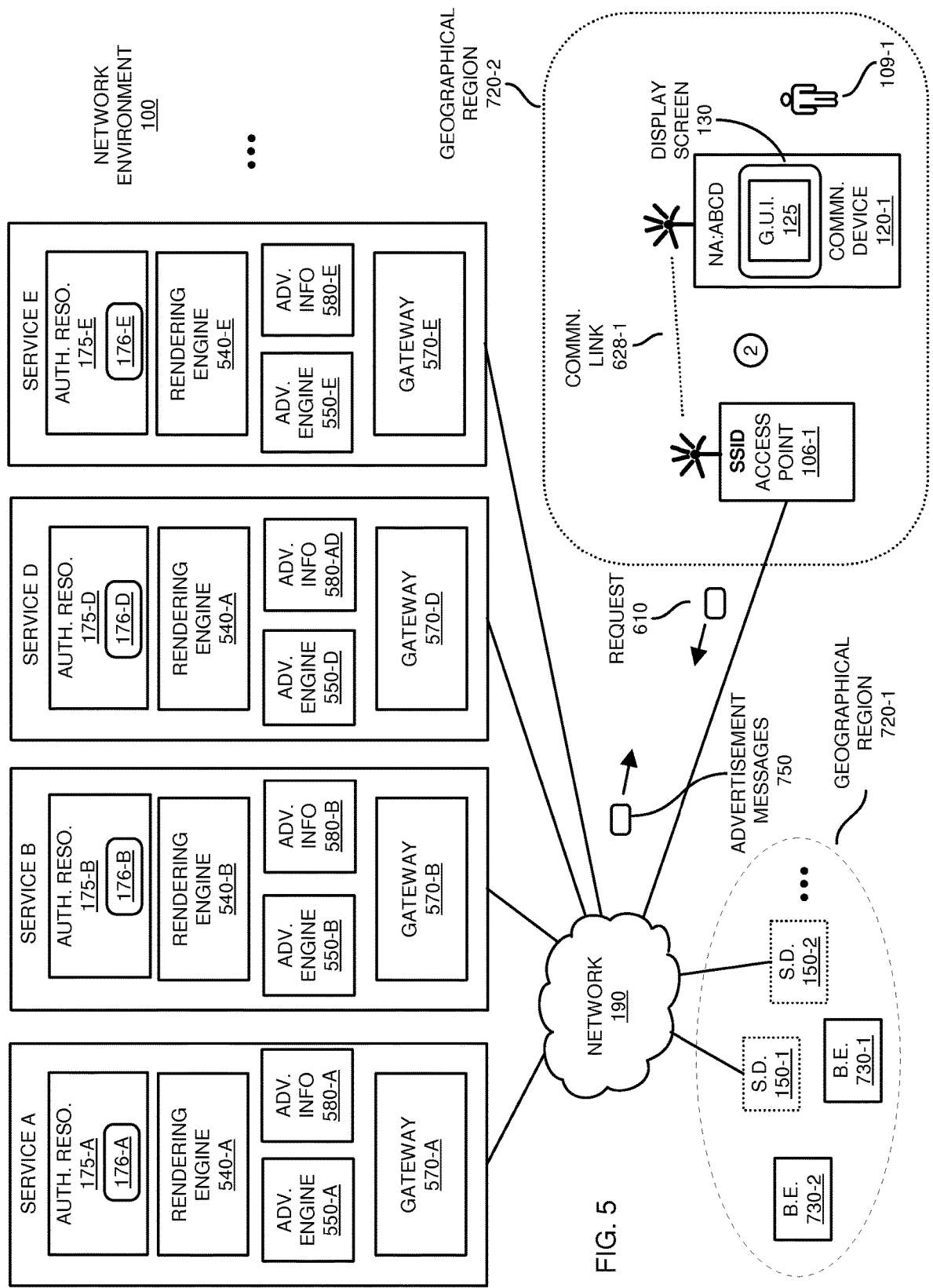
FIG. 5 is an example diagram illustrating use of an incremental service by a registered device and distribution of advertisements based on location according to embodiments herein.

FIG. 5 is an example diagram illustrating use of a respective service according to embodiments herein.

Subsequent to registering the mobile communication device 120-1 to the identified account 15523456-12 and/or incremental services A, B, D, and E associated with subscriber domain 150-1, assume that user 109-1 operates mobile communication device 120-1 to use service A. Service A in this example embodiment includes providing authorized users wireless access to network 190 via one or more wireless access points at public locations outside of the subscriber domain 150-1.

In this example embodiment, the wireless access point 106-1 is located in a public accessible domain outside of the subscriber domain 150-1. More specifically, the wireless access point 106-1 (assigned network name SSID2) is located in a hot spot (such as a service provider's WiFi™ hotspot outside of subscriber domain 150-1) in which the cable network service provider provides one or more subscribers or authorized users access to network 190.

To use service A, the mobile communication device 120-1 establishes a wireless communication link 628-1 with wireless access point 106-1 to communicate through gateway resource 145-1 to network 190. This can include authentication. For example, the wireless access point 106-1 transmits a request 610 for network access to authentication resource 175-A. The request 610 includes a unique identifier value ABCD of the mobile communication device 120-1 attempting to establish the wireless communication link 628-1. Mobile communication device 120-1 forwards its unique identifier value ABCD associated with the mobile communication device 120-1 to wireless access point 106-1 during or after establishing a wireless communication link 628-1.

Authentication resource 175-A checks whether the mobile communication device 120-1 has been pre-registered to use subscription service A associated with subscriber domain 150-1. In one embodiment, this includes determining whether the list 176-A includes identifier value ABCD assigned to the mobile communication device 120-1. As previously discussed, the mobile communication device 120-1 has been automatically pre-registered to use any of incremental services A, B, D, E, etc., associated with subscriber domain 150-1 based on detecting prior authorized use of a respective service by the mobile communication device 120-1. Therefore, in this example, the authentication resource 175-A detects that list 176-A does include the identifier value ABCD, indicating that the mobile communication device 120-1 corresponding user 109-1 are authorized to use the wireless access point 106-1.

Subsequent to authentication in which the service A determines that mobile communication device 120-1 is authorized to use the wireless access point 106-1 to access the network 190, the mobile communication device 120-1 is afforded access to a network such as the Internet through a communication resource such as gateway 570-A.

Note that service A (and corresponding system) further includes rendering engine 540-A. As its name suggests, rendering engine 540-A can be configured to render information such as web pages, messages, etc., associated with the service provider for display on the display screen 130 of mobile communication device 120-1. In one embodiment, subsequent to the authentication resource 175 determining that the user 109-1 and/or corresponding communication device 120-1 are authorized to use of service A (based on the unique identifier value of the mobile communication device 120-1 being included in list 176-A), the rendering engine 540-A initiates display of a respective message (such as welcome to TWC WiFi™) on the display screen 130 indicating that the mobile communication device 120-1 and user 109-1 are using a service provided by the service provider TWC.

As further shown, service A further includes advertisement engine 550-A. As its name suggests, the advertisement engine 550-A renders one or more advertisements for display on mobile communication device 120-1 for viewing by the respective user 109-1. In one embodiment, the advertisement engine 550-A retrieves the appropriate advertisement information 580-A (as more particularly shown in FIG. 6) for display on the display screen 130 depending upon a current location of the mobile communication device 120-1.

Figure 6:
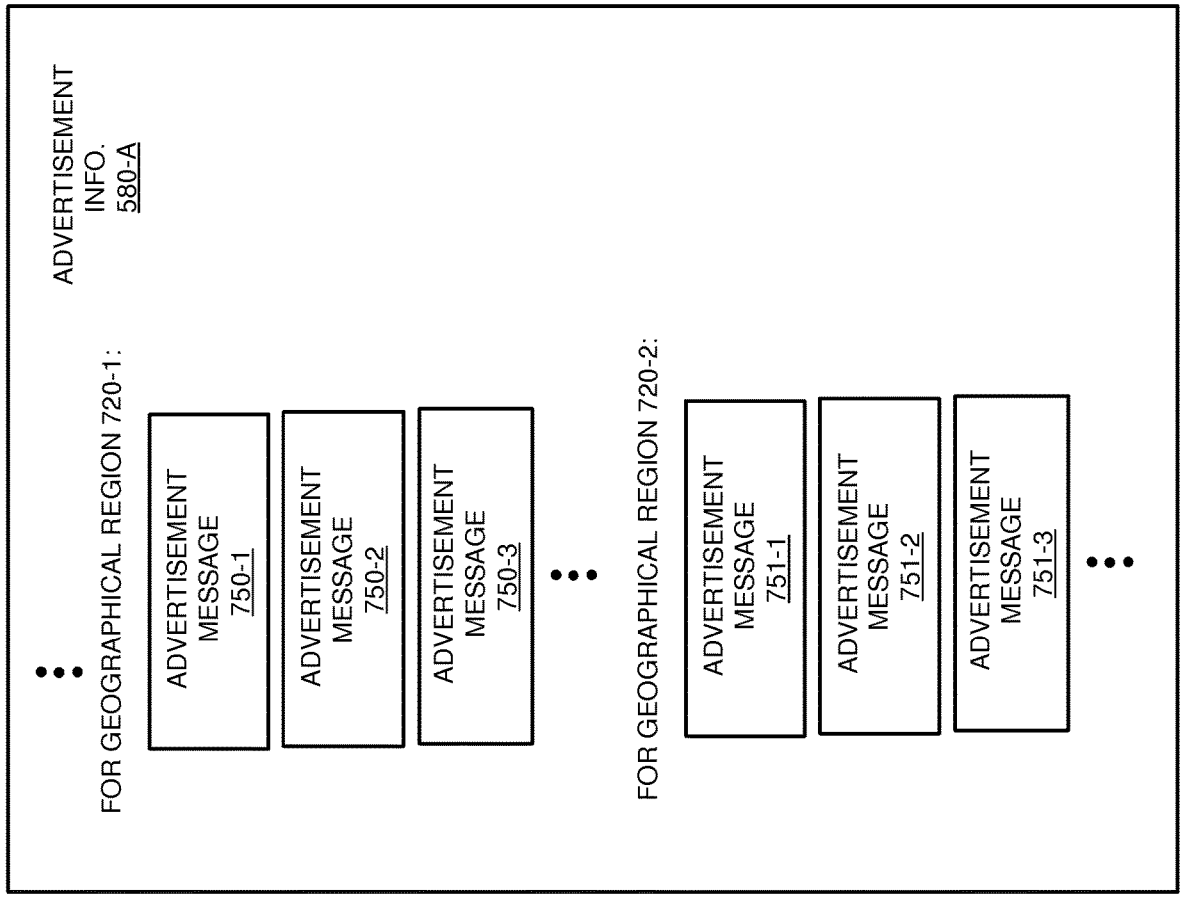
FIG. 6 is an example diagram illustrating classification of advertising information by geographical region according to embodiments herein.

FIG. 6 is an example diagram illustrating generation and storage of advertising information according to embodiments herein. As shown, one embodiment herein includes generating and classifying advertising information 680 based upon geographical regions. For example, as shown, advertisement messages 750-1, 750-2, 750-3, . . . are pertinent to geographical region 720-1; advertisement messages 751-1, 751-2, 751-3, . . . are pertinent to geographical region 720-2; and so on.

Referring again to FIG. 5, advertisements can be rendered in any suitable manner. For example, the advertisement engine 550-A can be configured to initiate display of the one or more advertisements as an overlay message, email messages, web page associated with the service provider, watermarking, etc.

Occasional or periodic receipt of the advertisement information may be a term of use associated with a service such as access via a WiFi™ hotspot outside of the subscriber domain 150-1. In other words, the user 109-1 operating mobile communication device 120-1 may be required to occasionally or periodically receive advertisement messages transmitted by advertisement engine 550-A as a term of using service A (wireless access point 106-1) to access the Internet through the gateway 570-A.

In one embodiment, the advertisement engine 550-A is configured to display advertisements on the display screen 130 of the mobile communication device depending upon its current location (geographical region 720-2 such as Los Angeles).

The current location of the mobile communication device 120-1 and/or corresponding wireless access point 106-1 can be determined in any number of ways. For example, the wireless access point 106-1 or mobile communication device 120-1 can be configured to transmit location information (indicating a current location of the mobile communication device and/or wireless access point) to the advertisement engine 550-A.

If desired, during use of a wireless communication link 628-1 between the mobile communication device 120-1 and the wireless access point 106-1, the advertisement engine 550-A can be configured to transmit, via mapping of the current location 720-2 to the appropriate advertisements, advertisement messages (such as advertisement messages 751-1, advertising message 751-2, etc., associated with the geographical region 720-2) to mobile communication device 120-1. Messages 751 pertain to the current location (geographical region 720-2) of the mobile communication device 120-1.

As an alternative to rendering advertisements pertinent to the current location of the mobile communication device 120-1, the advertisement engine 550-A can be configured to transmit, to the mobile communication device 120-1, advertising messages pertaining to a location of the subscriber domain 150-1 to which the mobile communication device was previously associated. For example, the advertisement engine 550-A can be configured to map an identity (such as the unique identifier value) of the mobile communication device 120-1 to a location of the subscriber domain 150-1 to which the mobile communication device 120-1 was associated during auto-registration as previously discussed. In such an instance, rather than transmitting advertising information pertinent to the location (geographical region 720-2 such as Los Angeles) where the mobile communication device 120-1 happens to currently reside, the advertising engine 550-A transmits advertising messages (such as advertisement message 750-1, advertising message 750-2, advertisement message 750-3, etc.) derived from or associated with geographical region 720-1 (the location of the subscriber domain in New York) for display to the user on the display screen 130 of the mobile communication device 120-1.

In one embodiment, advertising message 750-1 advertises goods and/or services associated with business entity 730-1 in geographical region 720-1 (such as a New York location where subscriber domain 150-1 is located); advertising message 750-2 advertises goods and/or services associated with business entity 730-2 in geographical region 720-1; and so on.

In one embodiment, the auto registration technique as discussed herein provides the mobile communication device 120-1 use of the one or more subscription services for only a limited time duration (such as hours, days, weeks, months, etc.) unless a respective head of household such as user 108-1 in the subscriber domain 150-1 confirms or provides appropriate input indicating that the mobile communication device is a permanent user. In such an instance, this extends the limited time duration to a longer duration.

As an example, the automatic registration of mobile communication device 120-1 can enable the respective user 109-1 to use respective network services A, B, D, and E for a time limit of two months. If the head of household user 108-1 decides to extend this time by validating the respective user 109-1 and corresponding mobile communication device 120-1, the respective user 109-1 is able to allow the mobile communication device 120-1 use of the incremental services A, B, D, and E beyond the two month time such as for a whole year or more.

In yet further embodiments, the cable network service provider can limit the number of users and/or corresponding mobile communication devices associated with a single subscriber account that are allowed to simultaneously use respective services.

For example, assume that the subscription service A represents the ability to use one or more wireless access points 106 located outside of the subscriber domain 150-1. Service A can be configured to keep track of the number of current users utilizing subscription service A to access network 190 of one or more different publicly located wireless access points in network environment 100. The service A can be configured to limit the maximum number of simultaneous users to 3. In such an instance, if each of the mobile communication devices 120-1, 120-2, and 121-1, are currently using subscription service A provided by the cable network service provider to subscriber user 108-1, the service A will (because there are currently 3 simultaneous users) deny newly requesting mobile communication device 120-3 from using a respective wireless access point to access network 190. This feature discourages the head of household subscriber user 108-1 from giving out credentials 115-1 to an unlimited number of persons, since the user 108-1 may then be prevented from using subscription services.

Figure 7:
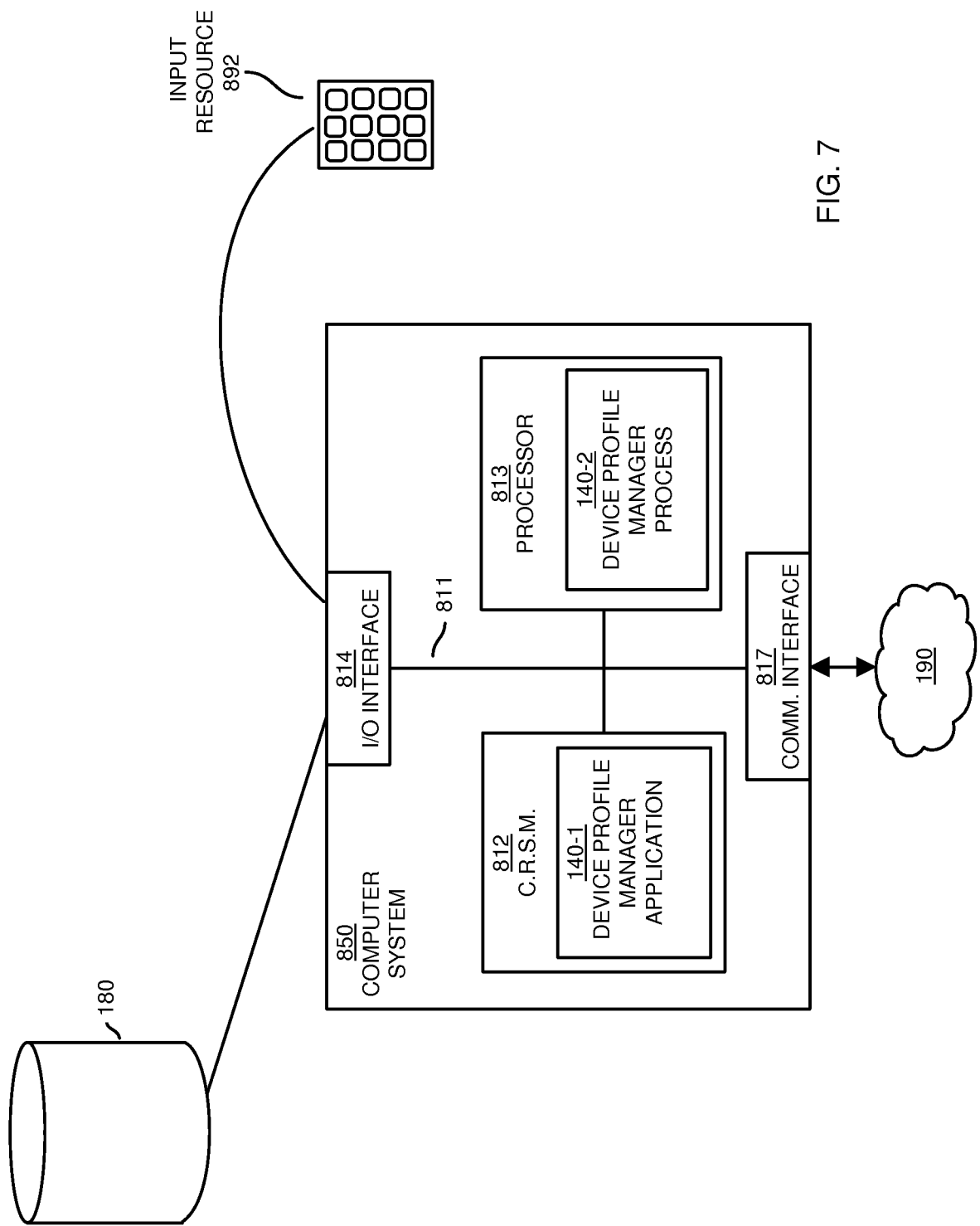
FIG. 7 is a diagram illustrating an example computer architecture in which to execute any of the functionality according to embodiments herein.

FIG. 7 is an example block diagram of a computer device for implementing any of the operations as discussed herein according to embodiments herein.

In one embodiment, one or more computers associated with computer system 850 carry out one or more operations associated with device profile manager 140 (or any of the other resources, engines, gateways wireless access points, etc., as discussed here).

As shown, computer system 850 of the present example includes an interconnect 811, a processor 813 (such as one or more processor devices, computer processor hardware, etc.), computer readable storage medium 812 (such as hardware storage to store data), I/O interface 814, and communications interface 817.

Interconnect 811 provides connectivity amongst processor 813, computer readable storage media 812, I/O interface 814, and communication interface 817.

I/O interface 814 provides connectivity to a repository 180 and, if present, other devices such as a playback device, display screen, input resource 892, a computer mouse, etc.

Computer readable storage medium 812 (such as a non-transitory hardware medium) can be any hardware storage resource or device such as memory, optical storage, hard drive, rotating disk, etc. In one embodiment, the computer readable storage medium 812 stores instructions (device profile manager application 140-1) executed by processor 813.

Communications interface 817 enables the computer system 850 and processor 813 to communicate over a resource such as network 190 to retrieve information from remote sources and communicate with other computers. I/O interface 814 enables processor 813 to retrieve stored information such as from repository 180.

As shown, computer readable storage media 812 is encoded with device profile manager application 140-1 (e.g., software, firmware, etc., including multiple executable instructions) executed by processor 813 (hardware). Device profile manager application 140-1 can be configured to include instructions to implement any of the operations as discussed herein.

During operation of one embodiment, processor 813 (e.g., computer processor hardware) accesses computer readable storage media 812 via the use of interconnect 811 in order to launch, run, execute, interpret or otherwise perform the instructions in the device profile manager application 140-1 stored on computer readable storage medium 812.

Execution of the device profile manager application 140-1 produces processing functionality such as device profile manager process 140-2 in processor 813. In other words, the device profile manager process 140-2 associated with processor 813 represents one or more aspects of executing device profile manager application 140-1 within or upon the processor 813 in the computer system 850.

Those skilled in the art will understand that the computer system 850 as discussed herein can include other processes and/or software and hardware components, such as an operating system that controls allocation and use of hardware resources to execute device profile manager application 140-1.

In accordance with different embodiments, note that computer system may be any of various types of devices, including, but not limited to, a wireless access point, a mobile computer, a personal computer system, a wireless device, server resource, gateway resource, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 850 may reside at any of one or more locations or can be included in any suitable one or more resource in network environment 100 to implement functionality as discussed herein.

Functionality supported by the different resources will now be discussed via flowcharts in FIGS. 8, 9, and 10. Note that the steps in the flowcharts below can be executed in any suitable order.

Figure 8:
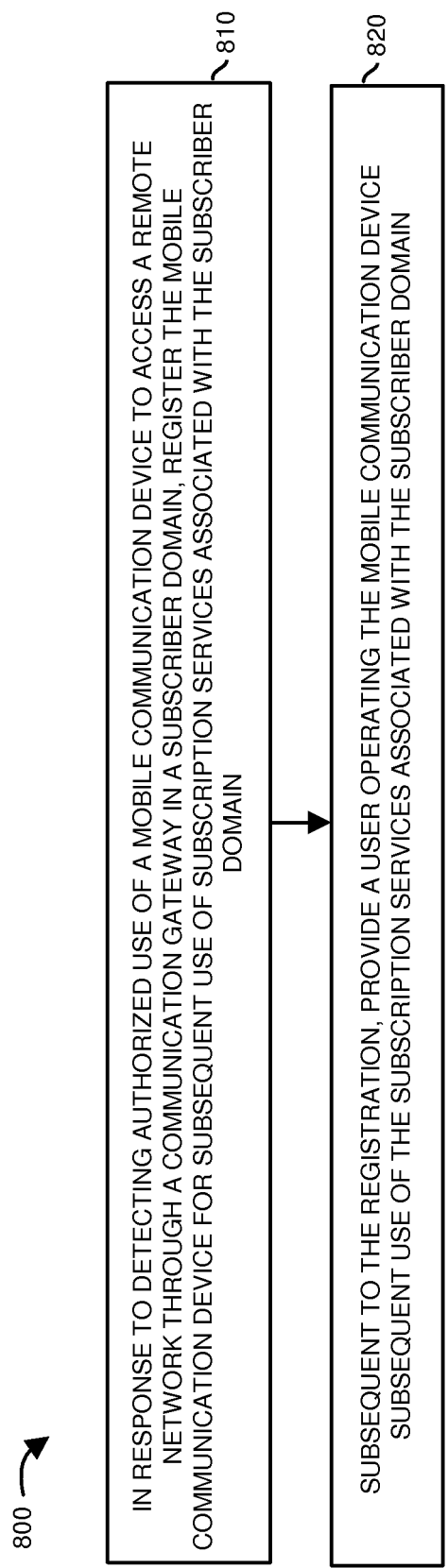
FIGS. 8, 9, and 10 are example diagrams illustrating methods according to embodiments herein.

FIG. 8 is a flowchart 800 illustrating an example method according to embodiments. Note that there will be some overlap with respect to concepts as discussed above.

In processing block 810, in response to detecting authorized use of a mobile communication device 120-1 to access a remote network 190 through a communication gateway (such as wireless access point 105-1, gateway resource 145, shared communication link 191, etc.) in a subscriber domain 150-1, the device profile manager 140 registers the mobile communication device 120-1 for subsequent use of subscription services associated with the subscriber domain 150-1. As previously discussed, registration of the mobile communication device 120-1 can include forwarding a unique identifier value ABCD assigned to mobile communication device 120-1 to one or more of the authentication resources 175.

In processing block 820, subsequent to the registration, the one or more authentication resources 175 provide a user operating the mobile communication device subsequent use of the subscription services associated with the subscriber domain.

Figure 9:
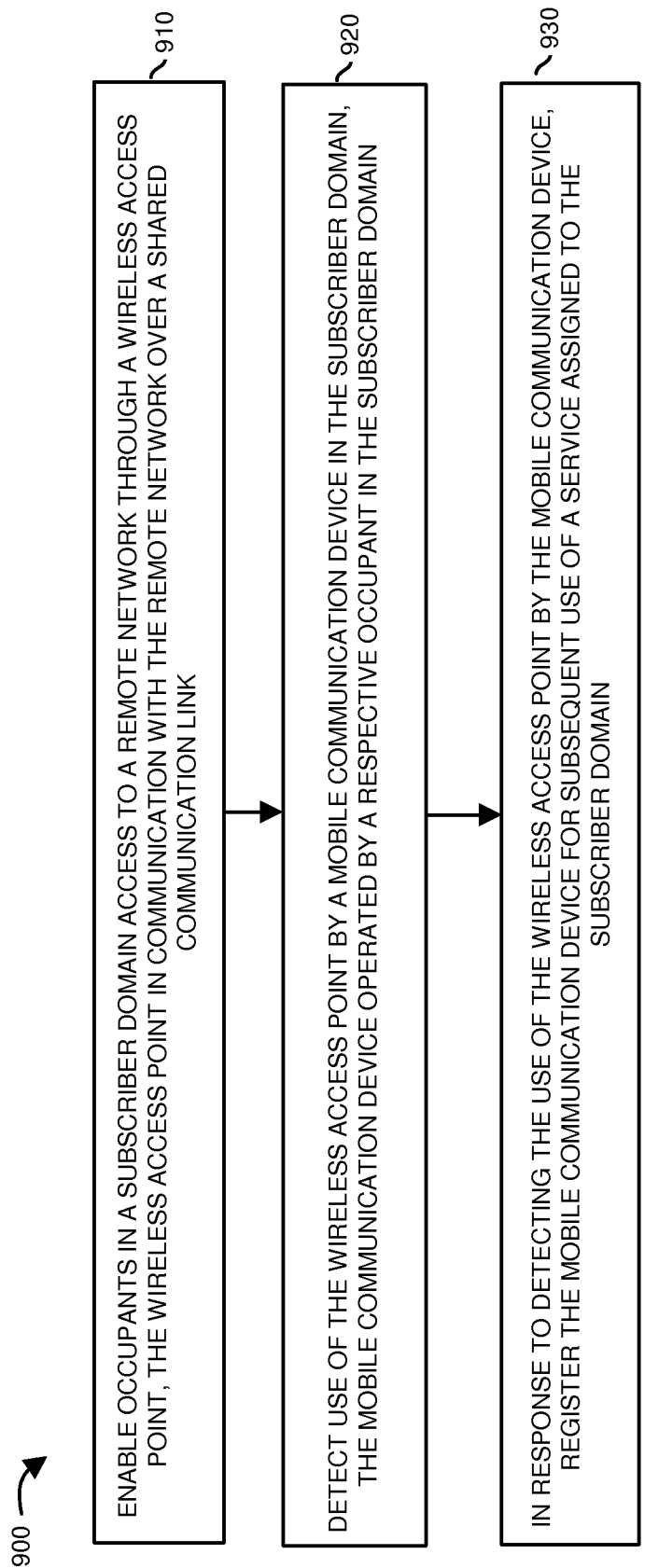

FIG. 9 is a flowchart 900 illustrating an example method according to embodiments. Note that there will be some overlap with respect to concepts as discussed above.

In processing block 910, a communication resource such as wireless access point 105-1 enables occupants in a subscriber domain 150-1 to access a remote network 190. The wireless access point 105-1 is in communication with the remote network 190 over a shared communication link 191.

In processing block 920, the device profile manager 140 detects use of the wireless access point 105-1 by the mobile communication device 120-1 in the subscriber domain 150-1. A respective occupant (such as user 109-1) operates the mobile communication device 120-1 in the subscriber domain 150-1.

In processing block 930, in response to detecting the authorized use of the wireless access point 105-1 by the mobile communication device 120-1, the device profile manager 140 registers the mobile communication device 120-1 for subsequent use of one or more services assigned to the subscriber domain 150-1. As previously discussed, this can include forwarding notification of authorized to use (including the unique identifier value of the communication device 120-1) to any of one or more authentication resources 175.

Figure 10:
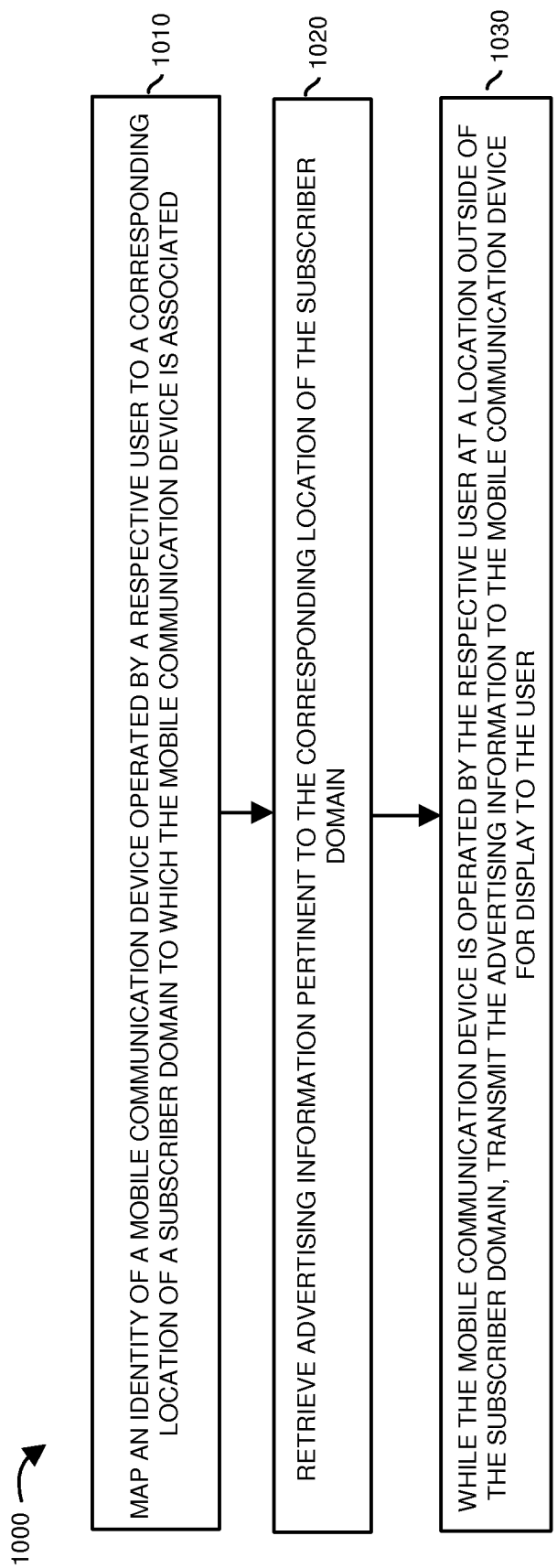

FIG. 10 is a flowchart 1000 illustrating an example method according to embodiments. Note that there will be some overlap with respect to concepts as discussed above.

In processing block 1010, the advertisement engine 550-A maps an identity of mobile communication device 120-1 operated by a respective user 109-1 to a corresponding location of a subscriber domain 150-1 to which the mobile communication device 120-1 is associated.

In processing block 1020, the advertisement engine 550-A initiates retrieval of advertising information (such as advertisement 750-1) pertinent to the corresponding location (geographical region 720-1) of the subscriber domain 150-1.

In processing block 1030, while the respective user 109-1 at a location (such as at geographical region 720-2) outside of the subscriber domain 150-1 operates the mobile communication device 120-1, the advertisement management resource 740 transmits the advertising information (such as advertisement 750-1) to the mobile communication device 120-1 for display on display screen 130 to the user 109-1.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   in response to detecting authorized use of a mobile communication device to access a remote network through a communication gateway in a subscriber domain, automatically registering the mobile communication device for subsequent use of subscription services associated with the subscriber domain;
   subsequent to the registration, providing a user operating the mobile communication device use of the subscription services associated with the subscriber domain;
   wherein the subscription services include: a first subscription service and a second subscription service assigned for use by a subscriber of the subscriber domain; and
   wherein automatically registering the mobile communication device for subsequent use of the subscription services includes: i) generating a first notification indicating that the mobile communication device is authorized to use the first subscription service; and ii) generating a second notification indicating that the mobile communication device is authorized to use the second subscription service.

2. The method as in claim 1, wherein detecting authorized use of the mobile communication device in the subscriber domain includes:
   detecting that the mobile communication device has been authenticated and is authorized to use a wireless access point in the subscriber domain to access the remote network through the communication gateway.

3. The method as in claim 2, wherein the mobile communication device uses credentials during authentication to establish a wireless communication session with the wireless access point in the subscriber domain.

4. The method as in claim 3, wherein the subscriber of the subscriber domain provides the user operating the mobile communication device the credentials to establish the wireless communication session with the wireless access point.

5. The method as in claim 1, wherein registering the mobile communication device further comprises:
   receiving a unique identifier value assigned to the mobile communication device; and
   communicating the unique identifier value of the mobile communication device to authentication resources controlling use of the subscription services.

6. The method as in claim 1, wherein the subscription services include an incremental service provided to a head of household user of the subscriber domain based on the head of household user subscribing to a data plan providing authorized occupants in the subscriber domain access to the remote network through the communication gateway, the incremental service being a subscription service other than accessing the remote network through the communication gateway.

7. The method as in claim 6, wherein the incremental service is assigned for use by the head of household user in the subscriber domain.

8. The method as in claim 1, wherein the mobile communication device provides credentials to establish a wireless communication link to obtain the authorized use of the communication gateway to access the remote network; and
   wherein registering the mobile communication device for subsequent use of the subscription services in response to detecting occurrence of the authorized use alleviates a need of having to manually register the mobile communication device for use of the subscription services.

9. The method as in claim 1, wherein the authorized use is authorization to establish a wireless communication link with a wireless access point in the subscriber domain.

10. The method as in claim 9, wherein the subscription services are supplemental services with respect to use of the wireless communication link to communicate through the communication gateway to the remote network.

11. The method as in claim 10, wherein a manager of the subscriber domain controls authorization of the user of the mobile communication device to use the supplemental services subsequent to the registration.

12. The method as in claim 1, wherein a manager of the subscriber domain provides control input indicating to register the mobile communication device for subsequent use of the subscription services.

13. The method as in claim 12 further comprising:
providing a registration notification to the manager of the subscriber domain in response to the registration, the registration notification indicating that the user of the mobile communication device has been registered to use the subscription services.

14. The method as in claim 1, wherein the mobile communication device is automatically registered to use the subscription services in response to the mobile communication device obtaining authorization to use the communication gateway to access the remote network.

15. The method as in claim 1, wherein the communication gateway is operable to detect the authorized use based on receiving a notification from a wireless access point, the notification indicating that the mobile communication device provided proper credentials to establish a wireless communication link with the wireless access point.

16. The method as in claim 1 further comprising:
in response to detecting the authorized use based on the mobile communication device providing credentials to communicate through the communication gateway, communicating from the communication gateway to a device manager to register the mobile communication device for subsequent use of the subscription services.

17. The method as in claim 1, wherein the subscription services are supplemental subscription services with respect to authorized use of the communication gateway; and
wherein registering the mobile communication device further comprises: i) receiving a unique identifier value assigned to the mobile communication device, and ii) communicating the unique identifier value to an authentication resource controlling use of the first subscription service of the subscription services, the first subscription service providing a service other than use of the communication gateway.

18. The method as in claim 1, wherein automatically registering the mobile communication device includes registering the mobile communication device for use of the first subscription service of the subscription services, the first subscription service being a supplemental subscription service of providing wireless access outside of the subscriber domain; and
wherein providing the user operating the mobile communication device use of the subscription services include:
providing the mobile communication device access to the remote network via an access point located outside of the subscriber domain.

19. The method as in claim 1, wherein providing the user operating the mobile communication device use of the subscription services includes:
providing the registered mobile communication device access to the remote network via an access point located outside of the subscriber domain.

20. The method as in claim 1, wherein the authorized use of the mobile communication device to access the remote network through the communication gateway is authorization to establish a wireless communication link with a wireless access point in the subscriber domain.

21. The method as in claim 1, wherein registering the mobile communication device for subsequent use of the subscription services includes: communicating a unique identifier value assigned to the mobile communication device to an authentication server controlling authentication of a first subscription service of the multiple subscription services; and
wherein providing the user use of the subscription services subsequent to the registration includes providing the user of the mobile communication device use of the first subscription service based on the unique identifier value.

22. The method as in claim 1, wherein the first subscription service is a subscription service other than use of the communication gateway to access the remote network.

23. The method as in claim 22, wherein the second subscription service is a subscription service other than use of the communication gateway to access the remote network.

24. The method as in claim 1, wherein the subscription services include a service other than use of the communication gateway to access the remote network.

25. The method as in claim 1, wherein the subscription services include a service to access the remote network via a wireless access point disposed outside the subscriber domain.

26. The method as in claim 1, wherein the mobile communication device is automatically registered to use the subscription services in response to the mobile communication device establishing a wireless communication link with a wireless access point disparately located with respect to the communication gateway.

27. The method as in claim 1, wherein automatically registering the mobile communication device for subsequent use of subscription services associated with the subscriber domain includes:
adding an identity of the user operating the mobile communication device to account information assigned to the subscriber domain, the account information indicating multiple users authorized to use the subscription services associated with the subscriber domain.

28. The method as in claim 27, wherein detecting authorized use of the mobile communication device in the subscriber domain includes:
detecting authentication of the mobile communication device during corresponding use of a wireless access point by the mobile communication device, the wireless access point disposed in the subscriber domain and providing connectivity to the communication gateway.

29. The method as in claim 27, wherein the subscription services are supplemental services with respect to use of a wireless communication link to communicate through the communication gateway to the remote network; and
wherein inclusion in the account information authorizes the user to use the supplemental services without the user having to provide further registration information other than a password to use the supplemental services.

30. The method as in claim 27, wherein the account information indicates identities of multiple users authorized to use the subscription services associated with the subscriber domain, the multiple users including the identity of the user operating the mobile communication device.

31. The method as in claim 27 further comprising:
providing, to an administrator associated with the subscriber domain, notification of the identity of the user added to the account information.

32. The method as in claim 27 further comprising:
authorizing the user use of the subscription services for a limited duration of time unless an administrator of the subscriber domain indicates that the user is a permanent user provided extended use beyond the limited duration of time.

33. The method as in claim 1, wherein automatically registering the mobile communication device for subsequent use of subscription services associated with the subscriber domain includes:
adding an identity of the mobile communication device to account information associated with the subscriber domain in response to detecting authentication of the mobile communication device during corresponding use of the wireless access point by the mobile communication device.

34. A method comprising:
enabling occupants in a subscriber domain access to a remote network through a wireless access point, the wireless access point in communication with the remote network over a shared communication link;
detecting use of the wireless access point by a mobile communication device in the subscriber domain, the mobile communication device operated by a respective occupant in the subscriber domain; and
in response to detecting the use of the wireless access point by the mobile communication device, automatically registering the mobile communication device for subsequent use of a service assigned to the subscriber domain;
wherein automatically registering the mobile communication device for subsequent use of the service further comprises: communicating an identity of the mobile communication device to a first authentication resource, the first authentication resource providing use of the service to the mobile communication device based on the identity;
wherein the service is a first service of multiple services assigned to the subscriber domain;
wherein the multiple services include a second service assigned to the subscriber domain; and
wherein automatically registering the mobile communication device further comprises: communicating the identity of the mobile communication device to a second authentication resource, the second authentication resource providing use of the second subscription service to the mobile communication device based on the identity.

35. The method as in claim 34, wherein detecting the use of the wireless access point by the mobile communication device includes:
receiving a message from a communication resource authorizing use of the wireless access point, the communication resource providing the mobile communication device access to the remote network.

36. The method as in claim 35, wherein registering the mobile communication device further comprises:
identifying an account associated with the subscriber domain, the account indicating the service assigned to the subscriber domain;
receiving a unique identifier value assigned to the mobile communication device; and
communicating the unique identifier value to an authentication resource controlling use of the service, the authentication resource enabling the mobile communication device subsequent use of the service based on the unique identifier value without requiring the user of the mobile communication device to provide additional credentials.

37. The method as in claim 36 further comprising:
generating a notification, the notification indicating that the mobile communication device has been newly assigned to use the service associated with the subscriber domain; and
transmitting the notification to a head of household of the subscriber domain to notify the head of household of the registration of the newly assigned mobile communication device for use of the service.

38. The method as in claim 37 further comprising:
subsequent to registering the mobile communication device to use the service, receiving a request from the mobile communication device to use the service while the mobile communication device is located outside of the subscriber domain;
via communications from the mobile communication device, receiving the unique identifier value of the mobile communication device; and
in response to detecting that the unique identifier value of the mobile communication device is assigned to use the service based on prior use of the mobile communication device in the subscriber domain, granting the mobile communication device use of the service.

39. The method as in claim 35 further comprising:
providing the registered mobile communication device access to the network via any of one or more access points located outside of the subscriber domain based on the unique identifier value and without requiring the registered mobile communication device to provide additional access credentials.

40. The method as in claim 34 further comprising:
producing usage information indicating usage of the service by the mobile communication device subsequent to the registration; and
providing the head of household of the subscriber domain access to the usage information.

41. The method as in claim 34 further comprising:
receiving a communication from a subscriber residing in the subscriber domain, the communication requesting to view identities of mobile communication devices registered to use the service;
in response to receiving the communication, providing notification to the subscriber indicating the identities of mobile communication devices, the identities of mobile communication devices enabled to use the service; and
in response to receiving a command from the subscriber, modifying which of the mobile communication devices is able to use the service to the subscriber domain.

42. The method as in claim 34, wherein the respective occupant operating the mobile communication device is a non-head of household occupant in the subscriber domain, the method further comprising:

providing the mobile communication device use of the service assigned to the subscriber domain for a limited time duration unless a respective head of household in the subscriber domain confirms that the mobile communication device should be afforded use of the service for a longer duration.

43. The method as in claim 34, wherein the service assigned to the subscriber domain is an incremental service assigned to the subscriber domain other than a standard service of providing the mobile communication device access to the network through the wireless access point, the method further comprising:

in response to detecting that the mobile communication device is authorized to use the wireless access point, registering the mobile communication device for use of the incremental service.

44. The method as in claim 34, wherein the service is a service other than providing the mobile communication device network access through the wireless access point.

45. A computer system comprising:

a mobile communication device; and computer processor hardware executing a device profile manager, the device profile manager operable to:

in response to detecting authorized use of the mobile communication device to access a remote network through a communication gateway in a subscriber domain, automatically register the mobile communication device for subsequent use of subscription services associated with the subscriber domain; and subsequent to the registration, provide a user operating the mobile communication device subsequent use of the subscription services associated with the subscriber domain;

wherein the device profile manager is further operative to: i) provide notification to a first authentication server controlling authentication of a first subscription service of the subscription services, the notification to the first authentication server indicating that the mobile communication device is authorized to use the first subscription service, and ii) provide notification to a second authentication server controlling authentication of a second subscription service of the subscription services, the notification to the second authentication server indicating that the mobile communication device is authorized to use the second subscription service.

46. The computer system as in claim 45, wherein the device profile manager is further operable to: detect proper authentication of the mobile communication device to use a wireless access point in the subscriber domain to access the remote network.

47. The computer system as in claim 46, wherein the mobile communication device uses an appropriate encryption key to establish a wireless communication session with the wireless access point.

48. The computer system as in claim 47, wherein a head of household user associated with the subscriber domain provides the user operating the mobile communication device the encryption key to establish the wireless communication session with the wireless access point.

49. Computer-readable storage hardware having instructions stored thereon, the instructions, when carried out by computer processor hardware, cause the computer processor hardware to:

in response to detecting authorized use of a mobile communication device accessing a remote network through a communication gateway in a subscriber domain, automatically register the mobile communication device for subsequent use of subscription services associated with the subscriber domain;

subsequent to the registration, provide a user operating the mobile communication device subsequent use of the subscription services associated with the subscriber domain;

provide notification to a first authentication server controlling authentication of a first subscription service of the subscription services, the notification to the first authentication server indicating that the mobile communication device is authorized to use the first subscription service; and provide notification to a second authentication server controlling authentication of a second subscription service of the subscription services, the notification to the second authentication server indicating that the mobile communication device is authorized to use the second subscription service.

50. A method comprising:

in response to detecting authorized use of a mobile communication device to access a remote network through a communication gateway in a subscriber domain, automatically registering the mobile communication device for subsequent use of subscription services associated with the subscriber domain; and subsequent to the registration, providing a user operating the mobile communication device use of the subscription services associated with the subscriber domain;

wherein automatically registering the mobile communication device for subsequent use of the subscription services includes:

providing notification to a first authentication server controlling authentication of a first subscription service of the subscription services, the notification to the first authentication server indicating that the mobile communication device is authorized to use the first subscription service; and providing notification to a second authentication server controlling authentication of a second subscription service of the subscription services, the notification to the second authentication server indicating that the mobile communication device is authorized to use the second subscription service.

51. The method as in claim 50, further comprising: providing the notification to the first authentication server in response to detecting that the mobile communication device is authorized to access the remote network through the communication gateway.

52. The method as in claim 50, wherein providing the user operating the mobile communication device use of the subscription services associated with the subscriber domain includes: via the first authentication server, providing the user use of the first subscription service without requiring the user of the mobile computer device to manually register for use of the first subscription service.

53. The method as in claim 50, wherein the subscription services include: a first subscription service and a second subscription service assigned for use by a subscriber of the subscriber domain; and wherein automatically registering the mobile communication device for subsequent use of the subscription services includes: i) generating a first notification indicating that the mobile communication device is authorized to use the first subscription service; and ii) generating a second notification indicating that the mobile communication device is authorized to use the second subscription service.

* * * * *